Aug. 21, 1956   W. H. KELLEY   2,759,403
CONTRACTION TYPE LOAD TRANSMISSION JOINT
Filed Oct. 17, 1952   3 Sheets-Sheet 1
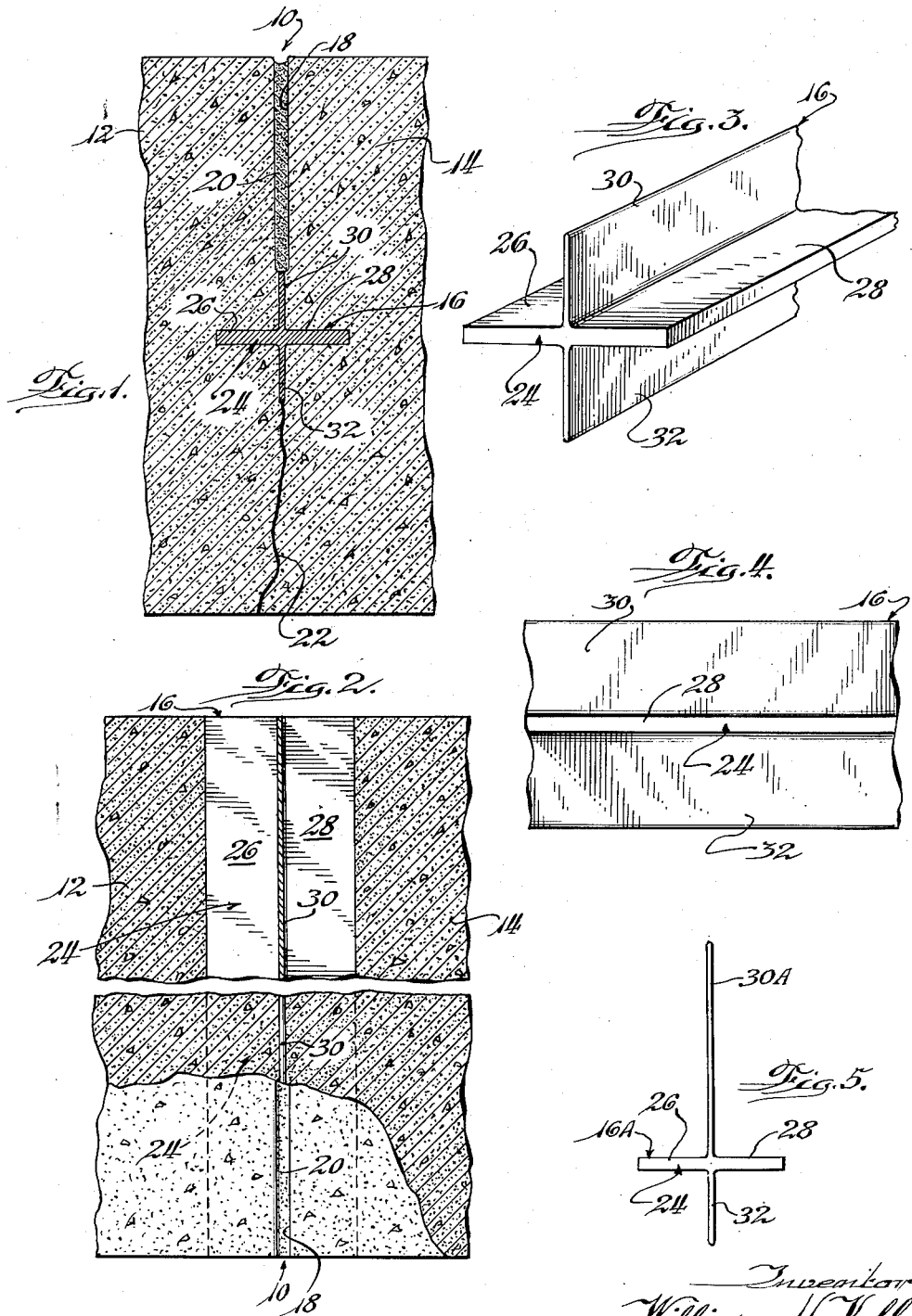

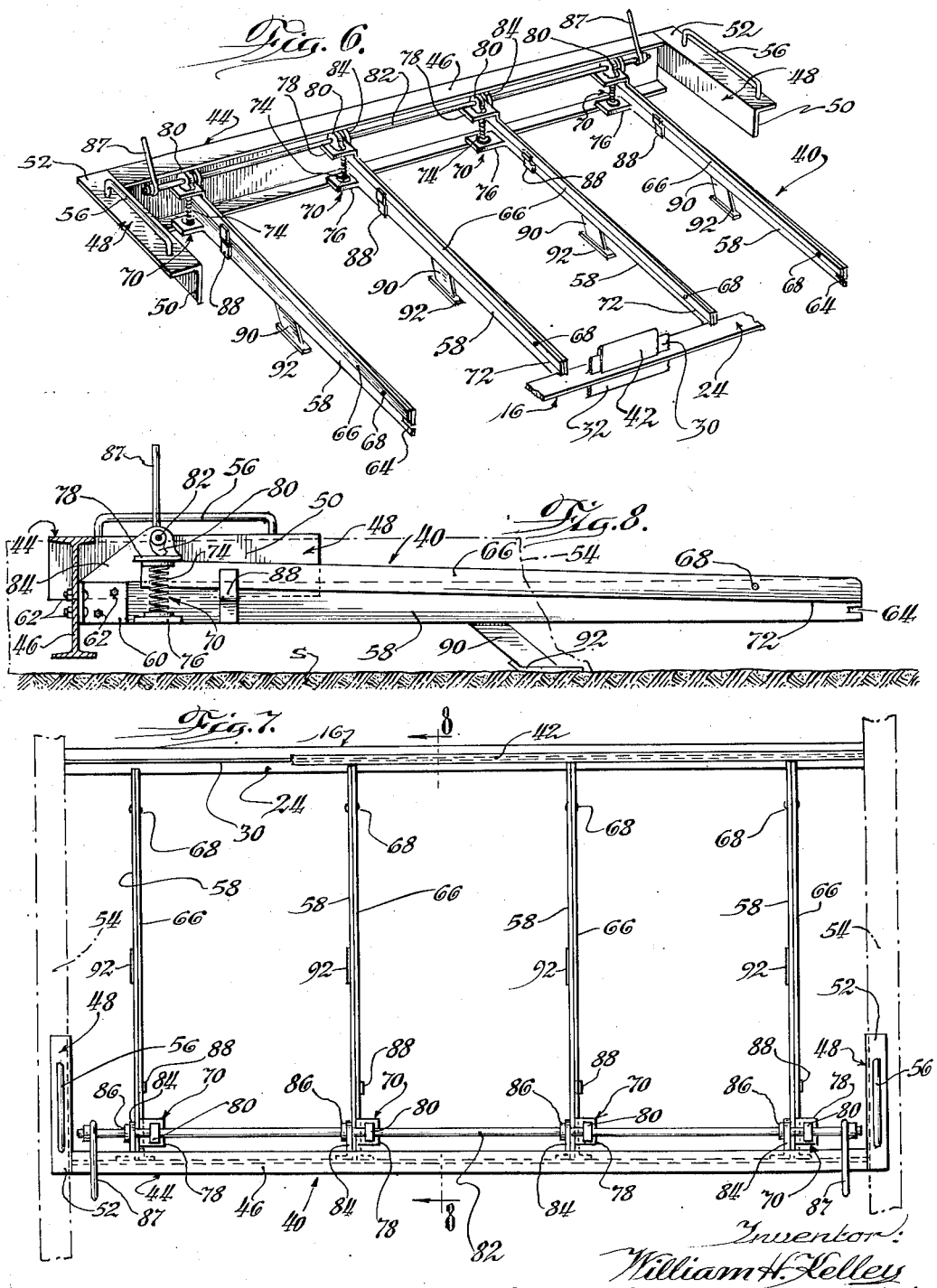

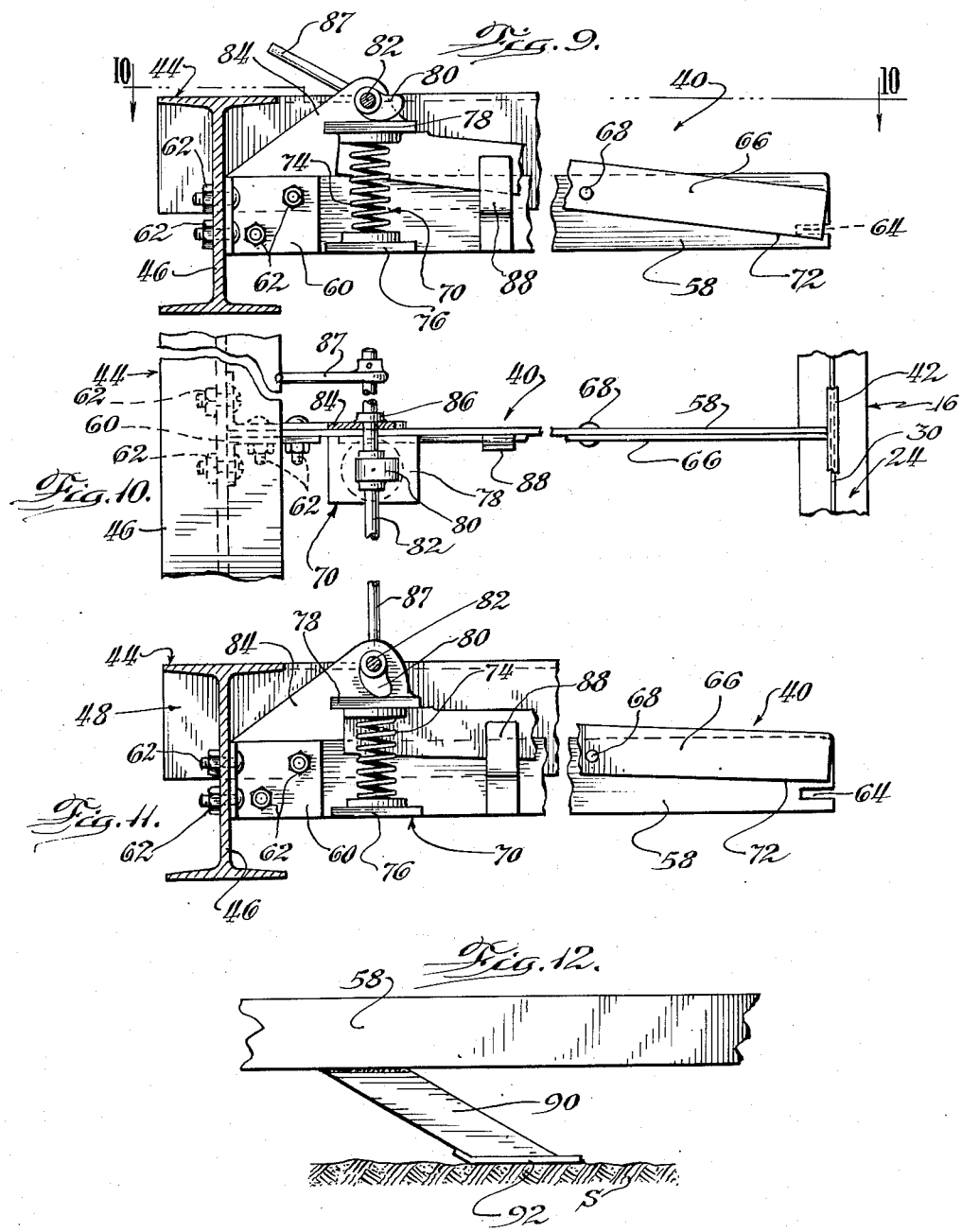

United States Patent Office 2,759,403
Patented Aug. 21, 1956

2,759,403

CONTRACTION TYPE LOAD TRANSMISSION JOINT

William H. Kelley, Oxford, Ind.

Application October 17, 1952, Serial No. 315,394

3 Claims. (Cl. 94—17)

The present invention relates to improvements in load transmitting joints for concrete highways.

It has been long recognized that the expansion and contraction of concrete highways must be accommodated by the regular interposition of expansion and contraction joints in the highways. Large numbers of these joints have been developed, some of which have proved reasonably practical when placed in service and others of which have met with consistent failure in actual service and in exhaustive tests simulating conditions encountered in highway usage.

Some of the early road joints were made without load transmitting devices, but it soon developed that the subsoil was inadequate to prevent relative vertical movements between the slabs or slab sections at their meeting edges, and serious damage was done to the highway at these points. This damage was accentuated, of course, by the longitudinal movement which accompanied the expansion and contraction of the slabs. Therefore, attention was turned to the development of a mechanical means for carrrying over a substantial portion of the load from one slab section to the other as the vehicle wheels approached and passed over the joint. After many years of development and experimentation, it appears that the type of load transmitting device which is almost universally acceptable to the highway departments of the forty-eight states, comprises a set of dowel bars anchored in one slab section and having a sliding fit in an opening in the other slab section, or having a sliding fit in both slab sections so as to permit movement of the slab sections relative to the bars. These dowel bars are usually three-quarters of an inch or one inch in diameter and are from eight to twenty-four inches long. Sometimes they are equipped with wing devices or other anchoring means which will secure the bar in one of the slab sections and a sleeve anchored in the other slab section in which the dowel bar has a sliding fit. These bars are spaced from twelve to eighteen inches on centers.

An exhaustive series of tests on highway joints points up the conclusion that dowel bar load transmitting devices have certain disadvantages which in some ways defeat their purposes. In the first place, the bearing areas in each slab section are spaced across the highway and each dowel, when under load, sets up localized and, therefore, undesirable strains in the concrete slab. Secondly, the dowel bars, being made of steel, are subject to rusting, which limits their effective life at their rated strength. When the dowel bars have corroded their frictional anchorage in the slab sections is increased to inhibit relative movement between the bars and slab sections and to produce strains in the concrete which causes cracking in the slabs adjacent the joint. Thirdly, dowel bars must be placed so that they are longitudinally parallel with the surface of the slab. If they are inserted at an angle as small as fifteen degrees to the slab surface, the load is not transmitted uniformly and strains are set up in the slab which causes it to crack and break. This is usually preceded by spalling of the highway surface adjacent the joint, necessitating constant attention and repair. In order to insure that the dowel bars are arranged parallel to slab surface, they must be carefully positioned, which positioning is usually obtained by supporting them from the subsoil. Various supports, anchors, braces, etc., have been developed, but none of them are simple and easy to use and consequently the labor involved is time consuming and, therefore expensive.

So-called plate dowels, comprising steel plate, have been tried in experimental installations only, but these have proved to be unsuccessful for generally the same reasons that spaced dowels are not completely successful. Furthermore, the plate dowels have a tendency to a prying action on the concrete over a substantial area, which causes slab failure adjacent the edges of the highway along the joints. Improper installation of plate dowels of course accentuates the prying action and speeds slab failure.

The load transmission joint of the present invention is primarily a contraction joint which permits contraction in the slab and a widening of the joint itself. Inasmuch as present highway construction design dictates that there be at least two contraction joints for every expansion joint, the importance of an inexpensive, simple, and efficient load transmission joint becomes obvious. The joint of this invention includes a load transmitting mechanism made entirely of a nonferrous metal having a lower modulus of elasticity than steel and other commonly used ferrous metals, and a bearing area which is at least as great as, if not greater than, the dowel construction commonly used theretofore. Furthermore, with the load transmission mechanism of this invention and the hereinafter described novel method of constructing the joint and the highway at the joint, almost perfect alignment of the joint mechanism relative to the highway slab sections is obtainable without the use of wire braces, anchors, and other such devices which now are found essential in constructing expansion and contraction joints.

It is, therefore, the principal object of the present invention to provide a new and improved load transmitting joint, particularly of the contraction type, which overcomes all of the disadvantages found in the joints now in common use without sacrificing joint strength.

Another object is to provide a new and improved load transmitting joint incorporating a load transmitting mechanism made from nonferrous metal, particularly alumninum, and aluminum alloys, including aluminum-magnesium alloys, which are not subject to corrosion and will last indefinitely.

Another object is to provide a new and improved load transmitting joint wherein the joint mechanism has a bearing area in the concrete slab or slab sections equal to or greater than that of conventional dowel bar construction joints, and which provides a uniform load distribution, thereby minimizing local stresses in the highway slab and preventing cracking of the slab sections adjacent the joint area.

A further object is to provide a new and improved transmission joint incorporating a joint mechanism which is readily installed by means of a simple removable mechanical device, thereby doing away with the multitude of manually installed brackets, braces, and similar devices now believed essential.

A further object is to provide a new and improved load transmission joint having strength characteristics equal to or greater than similar characteristics exhibited by joints now in use, and which is simpler to construct and substantially less costly.

Other objects and advantages of the present invention will become apparent from the following description taken in conjunction with the accompanying drawings, wherein Fig. 1 is a cross sectional view of a fragment of a concrete highway illustrating the load transfer joint of this invention, and particularly a joint of the contraction type;

Fig. 2 is a plan view partially broken into section at two different planes, illustrating the load transfer joint of this invention;

Fig. 3 is a fragmentary perspective view of the load transfer mechanism or member used in the joint shown in Figs. 1 and 2;

Fig. 4 is a fragmentary side elevational view of the load transfer mechanism or member;

Fig. 5 is an end view of a modified form of load transfer mechanism or member;

Fig. 6 is a perspective view of a jig adapted particularly to hold the load transfer mechanism of this invention in position while the mastic concrete is poured and formed around the joint mechanism during the construction of the highway;

Fig. 7 is a plan view of the jig shown in Fig. 6;

Fig. 8 is a sectional view taken substantially along the line 8—8 of Fig. 7, looking in the direction of the arrows;

Fig. 9 is an enlarged elevational view of one of the load transfer mechanism supporting arms and its associated clamping arm with the center portions of the arms omitted in order to compress the view endwise;

Fig. 10 is a view, partially in plan and partially in section, taken substantially along the line 10—10 of Fig. 9, looking in the direction of the arrows;

Fig. 11 is a view similar to Fig. 9, but showing the clamping arm in such position as to allow the supporting arm to receive the load transfer mechanism; and Fig. 12 is a fragmentary elevational view illustrating one of the supporting feet for the jig arm.

Referring first to Figs. 1 to 4, the reference character 10 designates generally a joint formed between a pair of adjacent concrete slab sections 12 and 14 in a concrete highway made of poured and formed concrete generally in the conventional manner but with the improved method for making the joint, which will be described hereinafter.

The joint 10 includes a joint mechanism or member 16 having a cross shaped cross sectional configuration with the joint mechanism 16 interposed about midway in the slab. Actually it is preferred that the horizontal center line of the joint mechanism 16 be about the horizontal center of the slab. Above the joint mechanism the slab sections are prespaced to provide a vertical slot 18 extending transversely of the highway, which slot 18 is preferably filled with a mastic such as one of those of asphalt composition to prevent the entry of dirt. Below the joint member 16 the meeting faces of the slab sections 12 and 14 are defined by a generally vertically extending but irregular crack 22 which is purposely induced into the concrete as it cures so that contraction of the slab sections can be effected without disturbing the joint.

As noted previously, the joint member 16 is of cross shaped configuration and comprises a horizontal plate 24 which may be divided into a pair of plate bearing areas or portions 26, 28. At the vertical center line of the plate 24 a pair of upwardly and downwardly aligned fins 30, 32 are formed, the fins being formed integrally with the plate 24. In the particular embodiment shown, the device measures two inches from tip to tip of the fins 30, 32, and two inches between the marginal edges of the bearing area providing plate 24. The fins are approximately one-sixteenth of an inch in thickness, while the plate 24 is approximately three times as heavy, measuring about three-sixteenths of an inch in thickness.

A feature of this joint mechanism 16 is that it be made of extruded aluminum or alloys of aluminum including aluminum-magnesium alloy and that it be continuous from one side of the highway to the other. Of course, when highways are more than two lanes wide, it is customary that they be made either a lane or two lanes at a time, and the joint mechanism 16 would only be as long as the width of the highway lane or lanes under construction.

The bearing areas provided by the plate portions 26 and 28 are continuous in each of the slab sections 12, 14, from one side of the highway to the other, thereby affording load distribution over the entire bearing area. This load distribution is substantially more uniform than that afforded by the transversely spaced dowel bars, and it consequently does not set up localized strains and stresses in the slab. Furthermore, the total bearing area provided by the specific joint shown on a twenty-two foot wide highway is actually slightly greater than the bearing and load transmitting area provided by a series of dowel bars twenty-four inches in length, three-quarters inch in diameter, and spaced fifteen inches on centers. A load transmission joint constructed in accordance with this invention underwent loading tests, and the results compared favorably with similar loading tests on a load transmission joint constructed of dowel bars and described above.

By the use of aluminum and alloys of aluminum and extrusion manufacturing processes, the joint mechanism 16 can be manufactured and installed with sufficient ease so that the finished joint cost is no greater, and in ordinary conditions should and will be somewhat lower, than the finished joint cost now being experienced. The lower modulus of elasticity of aluminum insures that what vertical slab movement there be between slab sections, may be absorbed by the joint mechanism 16 without failure of the joint by slight bending of the joint mechanism in the plate area 24. It is true, of course, that aluminum and aluminum alloys and other such non-ferrous metals are not subject to corrosion and, therefore, the joint mechanism 16 will have substantially longer life under all weather conditions than the steel dowel bars now employed. When all of these factors are considered, the joint of the present invention represents an improvement over those of the prior art and now in use in most states where concrete highways are the rule.

The joint of this invention is made by removably holding the joint mechanism 16 in a jig 40 (Figs. 6 to 12) with the upwardly extending fin 30 covered by a U-shaped cap 42 which extends downwardly over the fin 30 and rests on the upper surfaces of the bearing plate areas 26 and 28. The cap 42 extends upwardly a distance sufficient to lie just below the surface of the concrete when it has been completely poured around the joint mechanism 16 as the highway is constructed. With the joint mechanism so covered and held by the jig 40, the mastic concrete is poured in the customary fashion approaching the jig 40 and joint mechanism 16 from the direction which would be downwardly as seen in Fig. 7. The concrete is poured over the mechanism 16 and the outer ends of the jig 40, and covers the cap 42. The concrete is finished in the usual manner.

When the highway has been completed a short distance beyond the joint area, the jig 40 is manipulated to disengage it from the joint mechanism 16. It is then withdrawn and moved to the next position where a contraction joint is to be constructed in the highway. This removal of the jig does not disturb the joint mechanism 16, as sufficient concrete encompasses it so that its position is substantially secure.

The cap 42 is lifted upwardly so that its upper edge just breaks through the top of the highway at the joint or is just visible at that point as the concrete is allowed to set and cure. After it has set sufficiently so that there will be no more slumping of unsupported concrete, the cap 42 is removed. The joint is completed by filling the slot or space 18, which is formed by the cap 42 between the slab sections 12 and 14, with the asphalt mastic 20. During the concrete curing a certain amount of shrinkage occurs, and because the fin 32 projects downwardly the concrete cracks downwardly toward the subsoil or subgrade along the line 22, thereby completing the separation of the slab sections 12 and 14 from each other except for the interposition of the load transfer mechanism 16.

In order to insure that the concrete of the slab does not become bonded to the load transfer mechanism 16, the latter is greased before being incorporated in the joint. Thus when the slab sections contract and move with the changes in temperature there may be movement between the slab sections 12 and 14 and the transfer mechanism 16. However, the fins 30, 32 keep the joint mechanism 16 centered in the joint 10 and thus substantially equal bearing areas in the slabs 12 and 14.

A modified form of load transfer mechanism 16A is shown in Fig. 5 in end view. This mechanism is identical with that shown in Figs. 1 to 4, except that its vertical fin 30A is approximately three times as high as the fin 30. This mechanism 16A would be used in those circumstances where it is preferred not to use the cap 42 during the construction of the highway, but to embed the device 16A completely in the concrete, letting it cover all of its parts. Before the concrete has hardened, and when it has taken an initial set, a transverse slot is troweled in the concrete to expose the upper edge of the fin 30A and to form the crack or space 18 which is then filled with the asphalt mastic 20.

The jig 40 (Figs. 6 to 12) includes a frame 44 comprising a main transverse frame member 46 consisting of an I-beam and a pair of angle members 48. Each angle 48 has a leg 50 welded to the ends of the I-beam 46 with the other and top leg 52 preferably coplanar with the outer surface of the upper flange of the I-beam 46. The angle members 48 provide supports by means of which the frame 44 is carried on side forms 54 ordinarily used in concrete highway construction to define the edges of the highway. A pair of carrying handles 56 of U-shape configuration is welded to the upper and outer surfaces of the angle supports 48 and by means of which the jig 40 may be moved from one location to the next as the construction of the highway proceeds.

It will be observed from Fig. 8 that the I-beam 46 is of a size smaller than the minimum slab highway thickness. The ordinary minimum slab thickness is eight inches and the particular I-beam shown is a seven inch beam, thereby providing a clearance between the bottom of the I-beam and the subsoil or subgrades so that irregularities and unevenness in this will not in any way affect the proper positioning of the jig on the side forms 54 which would and might cause an awkward and improper positioning of the joint mechanism 16 in the joint as it is being constructed.

The jig 40 includes a plurality—four are shown as typical—of supporting arms 58 which are bolted, riveted, or welded at their inner end to short angle members 60 which are in turn bolted, riveted, welded, or otherwise secured to the web of the I-beam 46. It is preferred that the means of securing be bolts 62 so that during the season when highway construction is not practical the jig may be disassembled and conveniently stored. At their outer ends each of the arms 58 is formed with an inwardly directed slot 64 which is adapted to receive one side or one edge of the plate portion 24 of the load transmitting mechanism 16. A clamping arm 66 pivoted to the supporting arms at 68 toward the outer end of the supporting arm is biased by a biasing mechanism 70 in the clockwise direction (Figs. 8, 9, and 11) so that its outer end 72 engages the plate portion 24.

The biasing mechanism 70 comprises a spring 74 which is confined between a plate 76 fixed to the arm 58 and extending at right angles outwardly therefrom adjacent the bottom edge thereof, and a second plate 78 carried at the inner end of the clamping arm 66 and secured at right angles thereto adjacent its upper edge. The spring 74 is compressed between the plates 76 and 78, thereby tending to separate them and pivot the arm 66 in a clockwise direction about the pivot point 68.

The movement of each clamping arm 66 under the biasing effect of its associated means 70 is limited by a cam 80 fixed to a cam shaft 82 which is journaled in a series of bearings 86 carried in brackets 84, the brackets 84 being secured to the fixed supporting arm 58 and the web of the I-beam 46 by the bolts 62. Adjacent its outer end the cam shaft 82 is provided with operating handles 87 fixedly secured thereto so that the shaft may be rotated or rocked within operating limits to cause the cams 80 and biasing means 70 to operate the arm 66.

The cam 80 bears on the upper surface of the bracket 78, and it will be observed from a comparison of Figs. 9 and 11 that the different positions of the cam 80 determine the position of the arm 66 with respect to the fixed supporting arm 58. Thus when the cam is moved to the position shown in Fig. 9 by rocking the cam shaft 82 in the counterclockwise direction by means of the handle 87, the spring 74 pushes the bracket plate 78 upwardly, thereby pivoting the arm 66 about the pivot pin or rivet 68. This brings the outer end 72 of the clamping arm 68 downwardly beyond the slot 64, and if a joint mechanism 16 is inserted in the slot 64 as is shown in Figs. 6 and 10, the outer end of the arm 72 bears against the plate portion 24 to clamp the joint mechanism 16 in the slot and hold it securely in the outer end of the supporting arm 58. When it is desired to release the joint mechanism, or when it is desired to condition the jig for the reception of a joint mechanism, the cam shaft 82 is rotated in the clockwise direction, thereby bringing the high point of the cam against the upper surface of the bracket plate 78 to depress the inner end of the clamping arm 66 against the force of the spring 74, and thereby raise the outer end 72 so that the joint mechanism receiving slot 64 is clear either to release a joint mechanism 16 or to open the slot for reception of a joint mechanism.

In order that the arms 58 and 66 be maintained close together and parallel, a Z-shaped bracket 88 is secured to the arm 58 adjacent its inner end and slightly outwardly of the biasing means 70 to guide the inner end of the arm 66. The outer end of this arm is maintained close to the arm 58 by means of the pivot rivet 68.

In view of the fact that the arms 58 and 66 are relatively long, it is possible that there might be some side movement to them, and if preferred the jig arms 58 might be transversely steadied by downwardly and outwardly directed feet 90 fitted with soil engaging shoes 92. It is not intended that these plates 90 or feet 92 lend any support to the arms, since the entire support for the arms and the supported joint mechanism 16 is obtained from the main frame 44 including the arms 58, which are very firmly secured to the frame. Furthermore, it will be observed from the drawings that the arms 58 having their greater dimension arranged vertically are extremely rigid and would have no perceptible deflection from one end to the other under the very light load which would be imposed by the joint mechanism 16.

When the highway is being constructed, the jig 40 is carried on the side forms 54 as illustrated in Fig. 7. The concrete highway is constructed as indicated above, and the wet and mastic concrete is poured over the joint mechanism 16 and the outer ends of the arms 58 and 66 which support and clamp the joint mechanism 16 in the slots 64. After a sufficient amount of concrete has been placed and roughly finished so that the joint mechanism 16 is permanently located, one of the handles 87 is moved in a clockwise direction (Fig. 11), to depress the inner ends of the arms 66 by compressing the biasing means 70 against the force of the spring 74. This raises the outer ends of the arms so as to raise the ends 72 from engagement with the plate portion 24, thereby freeing the joint mechanism 16 from the clamping action of the jig. The jig is slid or moved rearwardly away from the joint along the upper surface of the forms 54. It is moved to the next location where a joint is to be formed in the highway, and the process is repeated. At the next position another joint mechanism 16 is inserted in the slots 64 together with its cap or cover 42, and the jig is located and aligned properly to support the load transmission mechanism 16 for the construction of the joint 10.

It will be seen from the foregoing description that the joint 10, constructed in accordance with this invention, using the novel joint load transfer mechanism 16, the simple and novel method, and the simple jig, may be manufactured at very low cost and with considerably less labor than the joints of the prior art. It is submitted, therefore, that the objectives claimed for this invention are all attained.

While the preferred embodiment of the load transmission joint and the method and apparatus for constructing the same, have been shown and described, it will be apparent that modifications and variations thereof may be made without departing from the underlying principles of the invention. It is therefore desired, by the following claims, to include within the scope of the invention all such variations by which substantially the results of this invention may be obtained through the use of substantially the same or equivalent means.

What is claimed as new and desired to be secured by United States Letters Patent is:

1. A contraction joint in a concrete highway slab comprising a load transfer member embedded in the highway slab extending transversely from side to side thereof and dividing the highway slab into slab sections, said joint member being positioned intermediate the top and bottom of the highway slab and having a relatively narrow horizontal load bearing plate and vertical fins extending equidistantly outwardly along the vertical center line of said member above and below said horizontal bearing plate and terminating at a substantial distance from the top and bottom of the highway slab, said joint member being made of a nonferrous metal selected from the group consisting of aluminum, aluminum alloys, and aluminum-magnesium alloys to form a relatively rigid member, said bearing plate being substantially thicker than said fins and the overall width of said bearing plate and said fins being substantially equal, said member being coated with a bond destroying medium, a slot of a width greater than said fin thickness extending from the top of the highway slab to the top edge of the upper of said fins, and a mastic sealer filling said slot, whereby a load imposed upon one of said slab sections is transmitted through said fins to the vertical slab faces in contact with said fins and to said other slab section by said load bearing plate, and wherein said mastic sealer prevents entry of moisture and dirt into said slot and between said joint member and said slab sections.

2. A contraction joint as claimed in claim 1 wherein the thickness of said load bearing plate is approximately three times that of said fins.

3. A contraction joint as claimed in claim 1 wherein the overall widths of said load bearing plate and said vertical fins are approximately two inches each.

References Cited in the file of this patent

UNITED STATES PATENTS

| | | |
|---|---|---|
| 271,582 | McKnight | Jan. 30, 1883 |
| 1,127,378 | Baker | Feb. 2, 1915 |
| 1,825,021 | Strand | Sept. 29, 1931 |
| 1,856,722 | Older | May 3, 1932 |
| 2,031,901 | Mitchell | Feb. 25, 1936 |
| 2,149,467 | Robertson | Mar. 7, 1939 |
| 2,228,052 | Gardner | Jan. 7, 1941 |
| 2,444,372 | Robertson | June 29, 1948 |
| 2,568,012 | Walsh | Dec. 29, 1952 |